(12) United States Patent
Kuroda

(10) Patent No.: US 6,370,091 B1
(45) Date of Patent: Apr. 9, 2002

(54) RECORDING MEDIUM HAVING MULTIPLE RECORDING LAYERS AND METHOD AND APPARATUS FOR RECORDING AND REPRODUCING INFORMATION ON THE RECORDING MEDIUM

(75) Inventor: Kazuo Kuroda, Tokorozawa (JP)

(73) Assignee: Pioneer Electronics Corporation, Tokyo (JP)

( * ) Notice: Subject to any disclaimer, the term of this patent is extended or adjusted under 35 U.S.C. 154(b) by 0 days.

(21) Appl. No.: 09/111,588

(22) Filed: Jul. 7, 1998

(30) Foreign Application Priority Data

Jul. 8, 1997 (JP) ............................................. 9-182803

(51) Int. Cl.⁷ .............................................. G11B 17/22
(52) U.S. Cl. ...................................... 369/30.08; 369/94
(58) Field of Search ............................... 369/32, 94, 54, 369/58, 47, 275.1, 283, 284, 286; 380/201, 203

(56) References Cited

U.S. PATENT DOCUMENTS

| | | | | |
|---|---|---|---|---|
| 5,303,225 A | * | 4/1994 | Satoh et al. | 269/275.3 |
| 5,428,597 A | * | 6/1995 | Satoh et al. | 369/275.1 |
| 5,696,743 A | * | 12/1997 | Kawasaki | 369/32 |
| 5,729,525 A | * | 3/1998 | Ishida et al. | 369/275.3 |
| 5,802,174 A | * | 9/1998 | Sako et al. | 380/4 |
| 5,881,032 A | * | 3/1999 | Ito et al. | 369/32 |
| 5,920,527 A | * | 7/1999 | Aoki | 369/32 |
| 6,141,299 A | * | 10/2000 | Utsumi | 369/32 |

FOREIGN PATENT DOCUMENTS

| | | |
|---|---|---|
| EP | A2 0 426 409 | 5/1991 |
| EP | A1 0 696 798 | 2/1996 |
| EP | A2 0 751 517 | 1/1997 |
| EP | A2 0 762 397 | 3/1997 |

OTHER PUBLICATIONS

Patent Abstracts of Japan, vol. 097, No. 007, Jul. 31, 1997 & JP 09 069264 A (Matsushita Electric Ind Co Ltd) Mar. 11, 1997 *Abstract.

* cited by examiner

Primary Examiner—Tan Dinh
(74) Attorney, Agent, or Firm—Sughrue Mion, PLLC (57) ABSTRACT

A recording method of information data which can prevent illegal copy of information data of a multilayer disc to a single-layer disc. A series of information data is divided into data blocks each having a predetermined data capacity, the data blocks are distributed and recorded to different recording layers of a recording medium, and a jump instruction to designate a next reading destination is recorded in at least one of the data blocks.

9 Claims, 11 Drawing Sheets

FIG.2

FIG. 3A INFORMATION DATA

FIG. 3B DATA FOR 1ST RECORDING LAYER

FIG. 3C DATA FOR 2ND RECORDING LAYER

FIG. 4

| JUMP INSTRUCTION | JUMP DESTINATION ADDRESS |
|---|---|
| $JA_1$ | AD20 |
| $JA_2$ | AD11 (=AD10 + B) |
| $JA_3$ | AD21 (=AD20 + B) |
| $JA_4$ | AD12 (=AD11 + B) |
| $JA_5$ | AD22 (=AD21 + B) |

AD10 : 1ST LAYER RECORDING START ADDRESS

AD20 : 2ND LAYER RECORDING START ADDRESS

| JUMP INSTURCTION | JUMP DESTINATION ADDRESS |
|---|---|
| JA1 | AD21 (=AD22 + B) |
| JA2 | AD11 (=COMPLEMENT OF AD21) |
| JA3 | AD22 (=AD20 + B) |
| JA4 | AD12 (=COMPLEMENT OF AD22) |
| JA5 | AD20 |

AD20: 2ND LAYER RECORDING START ADDRESS

RECORDING MEDIUM HAVING MULTIPLE RECORDING LAYERS AND METHOD AND APPARATUS FOR RECORDING AND REPRODUCING INFORMATION ON THE RECORDING MEDIUM

BACKGROUND OF THE INVENTION

1. Field of the Invention

The present invention relates to a method of recording information data to a recording medium.

2. Description of Related Art

As a type of DVD (digital versatile disk) that is an optical recording medium, there is what is known as DVD-ROM (read only memory) which has recording surfaces in two layers on one disc. In a DVD-ROM, movie software, computer data, or the like having a capacity on the maximum of 8.5 gigabytes is recorded and such a DVD-ROM is provided for the use of general user.

Besides read-only type discs such as the DVD-ROM, other types of DVD, i.e., DVD-R in which information data can be written only once by a user, and DVD-RAM in which written information data can be rewritten are being put to practical use.

In manufacturing a DVD recorder for recording information data on the DVD-RAM or the DVD-R, a method for preventing illegal copy of the contents of a DVD-ROM in which video software is recorded is desired.

SUMMARY AND OBJECTS OF THE INVENTION

It is, therefore, an object of the invention to provide an information data recording method which can prevent illegal copy of information data recorded in a multilayer disc.

According to the invention, there is provided a recording method of recording a series of information data into a recording medium having a plurality of recording layers, comprising the steps of: dividing the information data into data blocks each having a predetermined data capacity, distributing and recording each data block into the different recording layers of the recording medium; and recording a jump instruction for designating a next reading destination into at least one of the data blocks.

DETAILED DESCRIPTION OF THE PREFERRED EMBODIMENTS

Figure 1:
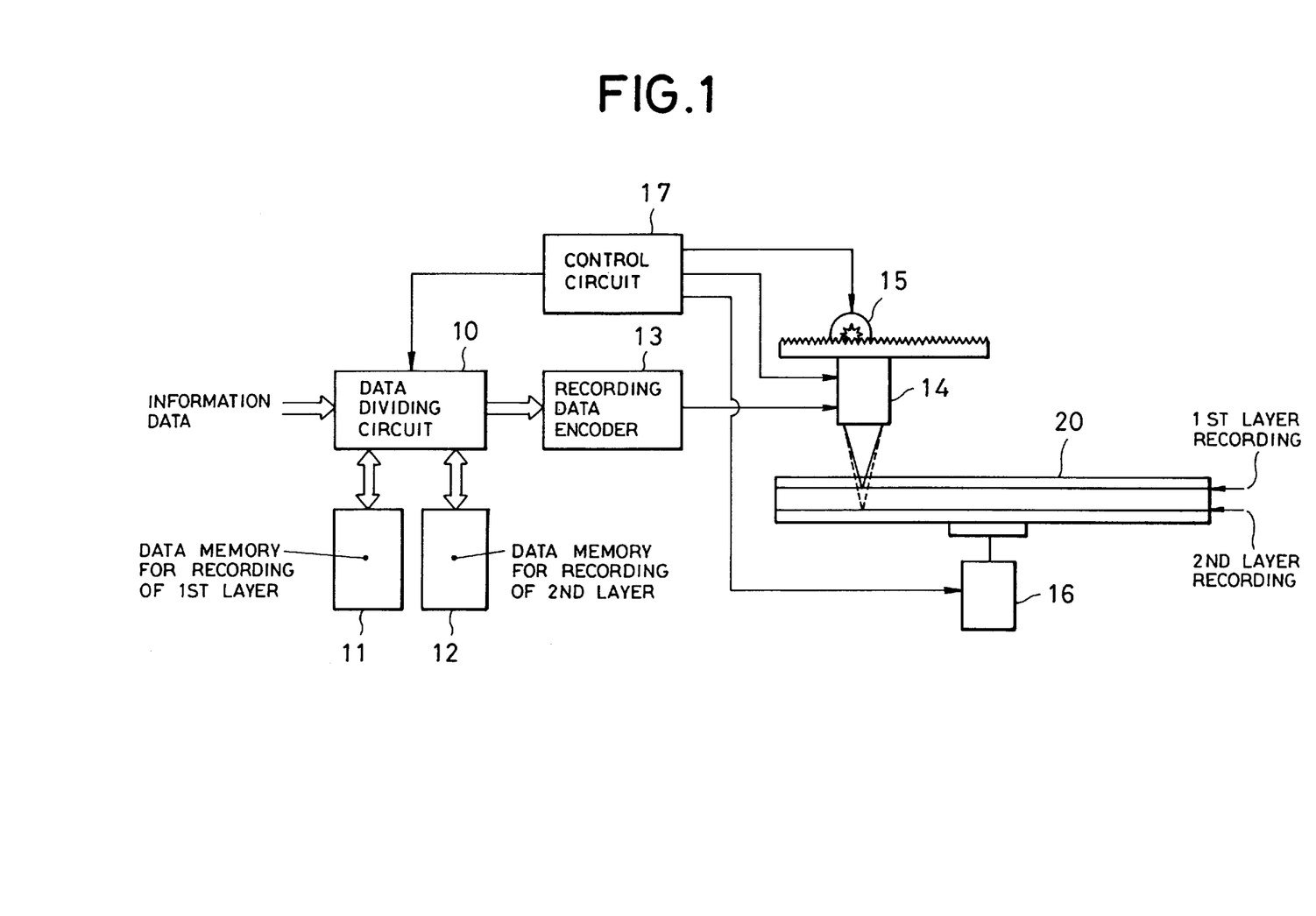
FIG. 1 is a diagram showing the construction of a master recording apparatus for recording information to a recording disc on the basis of a recording method according to the invention.

FIG. 1 is a diagram showing a construction of a master recording apparatus for recording a pit train having information data such as video software or the like onto two glass mother discs (hereinafter, referred to as a first recording mother disc 20 and a second recording mother disc 21) for transferring the pit train to a DVD-ROM having recording surfaces of two layers on based on a recording method of the invention.

In FIG. 1, a data dividing circuit 10 first divides information data supplied so as to be recorded to the first recording mother disc 20 corresponding to a first recording layer of a DVD-ROM into data blocks each having a predetermined capacity and adds a jump instruction for jumping a reproducing head of a reproducing apparatus (DVD player) which is not shown to the end of each of the data blocks. In the jump instruction, an address showing a jump destination of the reproducing head is also set. The data dividing circuit 10 further divides the data block series to which the jump instructions were added as mentioned above into two groups of an odd number designated data block group and an even number designated data block group. The data dividing circuit 10 writes the odd number designated data block group as information data for the first recording layer into a data memory 11 for recording the first layer and the even number designated data block group as information data for the second recording layer into a data memory 12 for recording the second layer.

Figure 2:
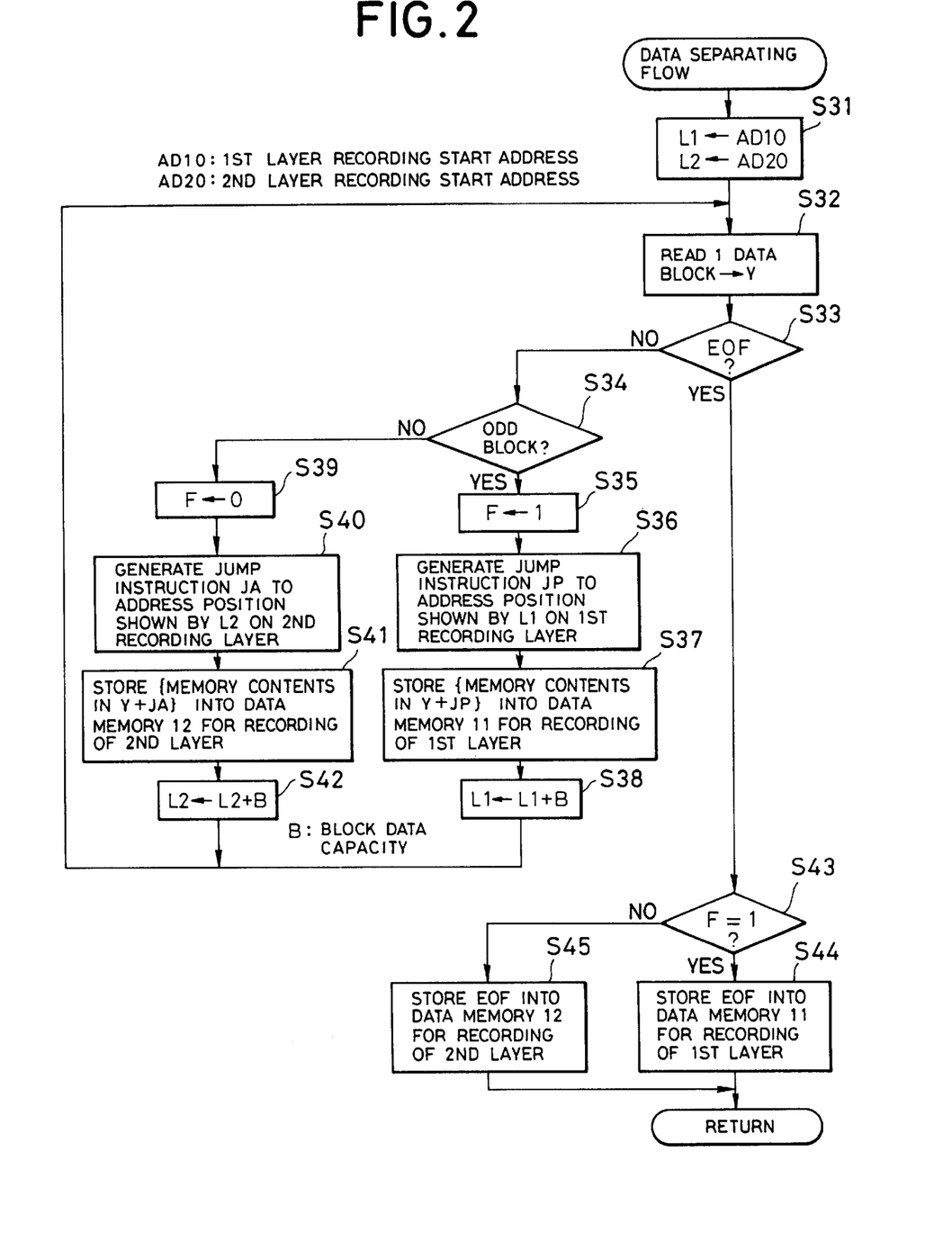
FIG. 2 is a diagram showing an example of an operation flow for performing a data separating operation.

FIG. 2 is a diagram showing an example of an operation flow for performing the data separating operation as mentioned above. The operation flow is performed by a CPU (not shown) for controlling the data dividing circuit 10.

In FIG. 2, first, the CPU stores a recording start address AD10 in the first recording layer of the DVD-ROM and a recording start address AD20 in the second recording layer into registers L1 and L2 (not shown) built in the CPU, respectively (step S31). Subsequently, the CPU reads information data supplied to be recorded onto the recording mother disc 20 every data block of the predetermined capacity and stores it into a register Y (not shown) (step S32). The CPU discriminates whether EOF indicative of the end position of the information data exists in the fetched data block or not (step S33). When it is determined in step S33 that the EOF does not exist, the CPU discriminates whether the data block fetched into the register Y is the odd number block or not (step S34).

When it is determined that it is the odd number block in step S34, a flag "1" indicative of the odd number block is stored into a flag resistor F (not shown) (step S35). Subsequently, the CPU generates a jump instruction JA to an address position (address position on the first recording layer) stored in the register L1 (step S36). The CPU reads out the data block fetched into the register Y and stores the data block in which the jump instruction JA was added to the end into the data memory 11 for recording the first layer (step S37). The CPU overwrites and stores a new address obtained by adding a block data capacity B of one data block including the jump instruction JA to the address stored in the register L1 into the register L1 (step S38). After completion of step S38, the CPU returns to the execution of step S32.

On the other hand, when it is determined in step S34 that the data block fetched in the register Y is not the odd number block, the CPU stores a flag "0" indicative of the even number block into the flag register F (step S39). The CPU generates the jump instruction JA to an address position (address position on the second recording layer) stored in the register L2 (step S40). The CPU reads out the data block fetched in the register Y and stores the data block in which the jump instruction JA was added to the end into the data memory 12 for recording the second layer (step S41). Subsequently, the CPU overwrites and stores a new address obtained by adding the block data capacity B of one data block including the jump instruction JA to the address stored in the register L2 into the register L2 (step S42). After completion of step S42, the CPU returns to the execution of step S32.

When it is determined in step S33 that the EOF indicative of the end position of the information data exists in the data block stored in the register Y, the CPU discriminates whether the storage contents of the flag register F indicate the flag "1" or not (step S43). When it is determined in step S43 that the storage contents of the flag register F indicate the flag "1", the CPU stores the EOF indicative of the end position of the information data into the data memory 11 for recording the first layer (step S44). On the other hand, when it is determined in step S43 that the storage contents of the flag register F do not show the flag "1", the CPU stores the EOF indicative of the end position of the information data into the data memory 12 for recording the second layer (step S45). When either step S44 or S45 is finished, the CPU exits the data separation flow and returns to the execution of a main routine (not described).

Figure 3A:
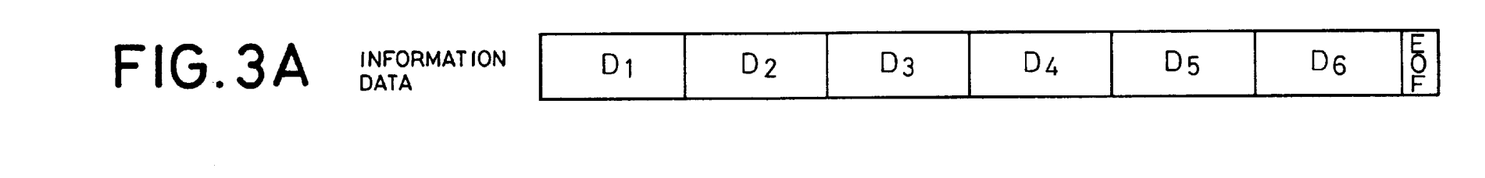
FIGS. 3A to 3C are diagrams showing an example of information data and separated information data for first and second recording layers.
Figure 3B:
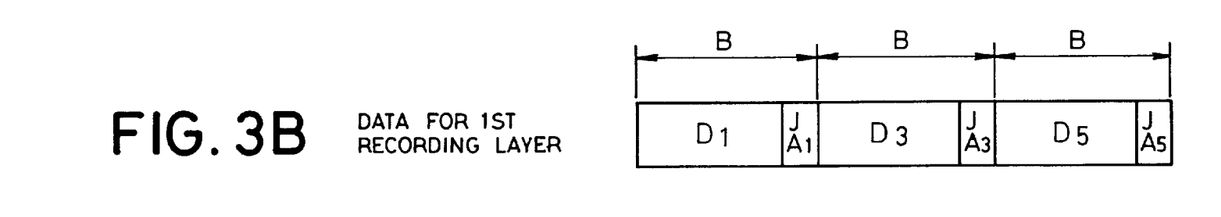
Figure 3C:
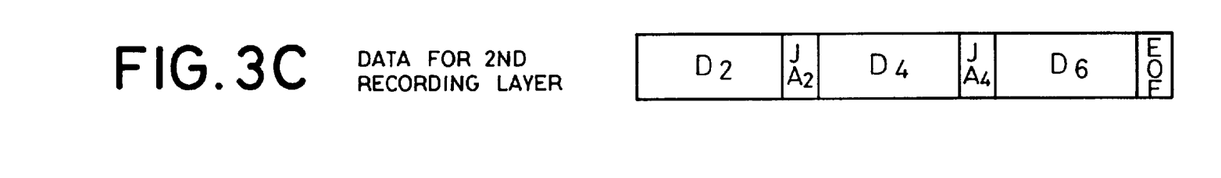

FIG. 3 is a diagram showing an example of the separation result of the information data executed by the operation flow.

That is, when an information data series as shown in FIG. 3A is supplied to the data dividing circuit 10, the data dividing circuit 10 divides the information data into data blocks $D_1$ to $D_6$ each having a predetermined data capacity and sequentially fetches them on a data block unit basis. Subsequently, the data dividing circuit 10 divides the data blocks $D_1$ to $D_6$ into odd number designated data blocks $D_1$, $D_3$, and $D_5$ and the even number designated data blocks $D_2$, $D_4$, and $D_6$. The data dividing circuit 10 adds jump instructions $JA_1$, $JA_3$, and $JA_5$ (which will be described later) to the ends of the odd number data blocks $D_1$, $D_3$, and $D_5$, respectively, and connects them, thereby forming information data for the first recording layer. In this instance, the capacity of each data block including the jump instruction is equal to the block data capacity B as mentioned above. The data dividing circuit 10 adds jump instructions $JA_2$ and $JA_4$ (which will be described later) to the ends of the even number data blocks $D_2$, $D_4$, and $D_6$, (except the last data block $D_6$) as shown in FIG. 3(C), respectively, and connects them, thereby obtaining information data for the second recording layer. In this case, the capacity of each data block including the jump instruction is equal to the block data capacity B.

Figure 4:
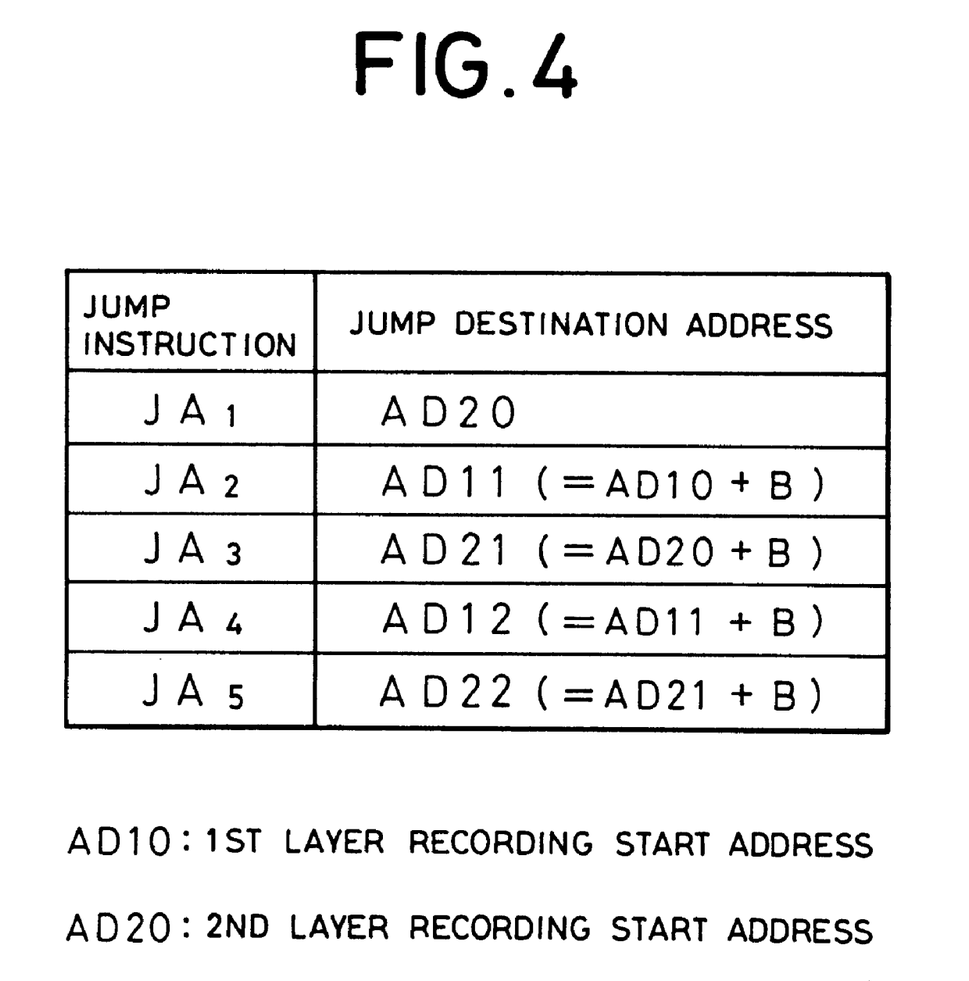
FIG. 4 is a diagram showing jump destination addresses by jump instructions $JA_1$ to $JA_5$.

FIG. 4 is a diagram showing the jump destination addresses indicated by the jump instructions $JA_1$ to $JA_5$.

As shown in FIG. 4, the jump destination address by the jump instruction $JA_1$ which is added to the end of the data block $D_1$ is the address AD20 showing the recording start position for the second recording layer of the DVD-ROM. That is, in the reproducing operation, the jump instruction $JA_1$ is an instruction to jump the pickup from the first recording layer of the DVD-ROM to the address AD20 of the second recording layer. The address AD20 shows the head position of the data block $D_2$ on the DVD-ROM. The jump destination address by the jump instruction $JA_2$ which is added to the end of the data block $D_2$ is an address AD11 obtained by adding the block data capacity B to the address AD10 showing the recording start position for the first recording layer of the DVD-ROM. That is, in the reproducing operation by the reproducing apparatus, the jump instruction $JA_2$ is an instruction to jump the pickup from the second recording layer of the DVD-ROM to the address AD11 of the first recording layer. The address AD11 shows the head position of the data block $D_3$ on the DVD-ROM. The jump destination address by the jump instruction $JA_3$ which is added to the end of the data block $D_3$ is an address AD21 obtained by adding the block data capacity B to the address AD20. That is, in the reproducing operation by the reproducing apparatus, the jump instruction $JA_3$ is an instruction to jump the pickup from the first recording layer of the DVD-ROM to the address AD21 of the second recording layer. The address AD21 shows the head position of the data block $D_4$ on the DVD-ROM. The jump destination address by the jump instruction $JA_4$ which is added to the end of the data block $D_4$ is an address AD12 obtained by adding the block data capacity B to the address AD11. That is, in the reproducing operation by the reproducing apparatus, the jump instruction $JA_4$ is an instruction to jump the pickup from the second recording layer of the DVD-ROM to the address AD12 of the first recording layer. The address AD12 shows the head position of the data block $D_5$ on the DVD-ROM. The jump destination address by the jump instruction $JA_5$ which is added to the end of the data block $D_5$ is an address AD22 obtained by adding the block data capacity B to the address AD21. That is, in the reproducing operation by the reproducing apparatus, the jump instruction $JA_5$ is an instruction to jump the pickup from the first recording layer of the DVD-ROM to the address AD22 of the second recording layer. The address AD22 shows the head position of the data block $D_6$ on the DVD-ROM.

The information data for the first recording layer and the information data for the second recording layer having the formats as mentioned above are written into the data memory 11 for recording the first layer and the data memory 12 for recording the second layer, respectively.

When a recording start instruction is supplied from a control circuit 17, the data dividing circuit 10 sequentially reads out the information data for the first recording layer as shown in FIG. 3B from the data memory 11 for recording the first layer and supplies to a recording data encoder 13.

The recording data encoder 13 ($^{8}/_{16}$)-modulation encodes the information data supplied from the data dividing circuit 10, thereby generating an ($^{8}/_{16}$)-modulation signal. Subsequently, the recording data encoder 13 converts the ($^{8}/_{16}$)-modulation signal into a binary serial signal and supplies it as a recording signal to a recording head 14. A slider mechanism 15 moves the recording head 14 to the position on the DVD-ROM according to a recording position signal which is supplied from the control circuit 17. The recording head 14 irradiates a recording beam of a light amount according to the recording signal supplied from the recording data encoder 13 onto the recording mother disc 20 which is rotated by a spindle motor 16, thereby recording the recording signal.

After completion of the whole recording of the recording signal based on the information data for the first recording layer to the first recording mother disc 20, the recording mother disc 20 is exchanged to the second recording mother disc 21 to which the recording signal based on the information data for the second recording layer should be recorded. After that, the data dividing circuit 10 sequentially reads out the information data for the second recording layer as shown in FIG. 3C from the data memory 12 for recording the second layer and supplies it to the recording data encoder 13. The recording data encoder 13 generates the recording signal as mentioned above based on the supplied information data and supplies it to the recording head 14. The recording head 14 irradiates the recording beam of the light amount according to the supplied recording signal onto the recording mother disc 21, thereby recording the recording signal based on the information data for the second recording layer.

By executing an electroforming process or the like to each of the first recording mother disc 20 and second recording mother disc 21 on which the recording signals were recorded as mentioned above, a stamper for the first recording layer and a stamper for the second recording layer are manufactured, respectively. A half mirror film is sputtered onto the disc for the first recording layer formed by the stamper for the first recording layer. A high reflecting film is sputtered onto the disc for the second recording layer formed by the stamper for the second recording layer. Both discs are adhered, thereby completing a DVD-ROM having the recording surfaces of two layers.

A more detailed manufacturing method of the DVD-ROM having the recording surfaces of two layers has been disclosed, for example, in Japanese Patent Kokai No. 8-96406 (JP-A-8-96406).

Figure 5:
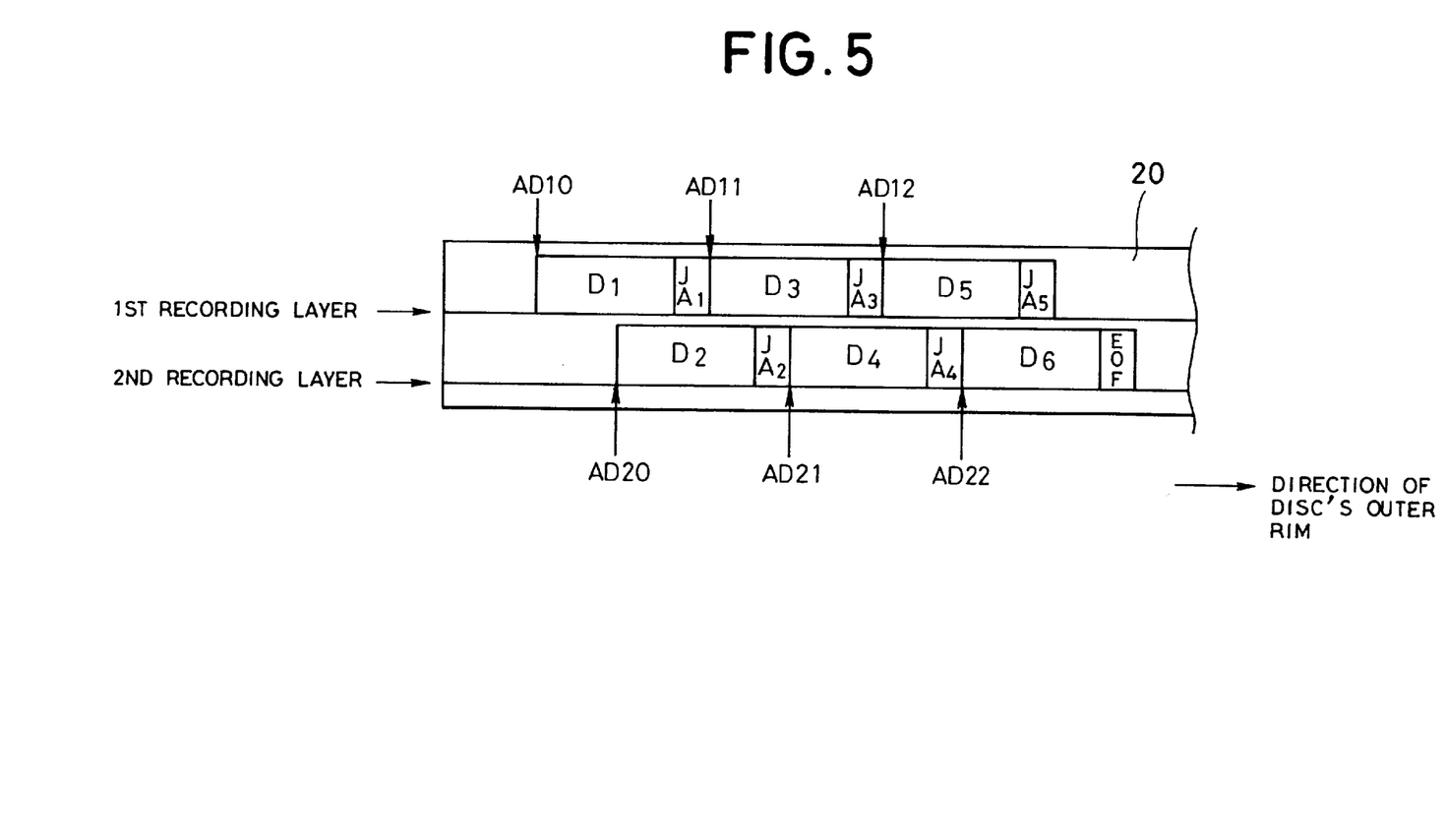
FIG. 5 is a diagram showing an example of a recording format of a DVD-ROM.

FIG. 5 is a diagram showing a recording format of information data on the DVD-ROM having the recording surfaces of two layers manufactured by the method as mentioned above from the first recording mother disc 20 and second recording mother disc 21 when the information data for the first and second recording layers shown in FIGS. 3B and 3C are recorded onto the first recording mother disc 20 and second recording mother disc 21.

As shown in FIG. 5, the information data for the first recording layer shown in FIG. 3B is sequentially recorded from the position of the address AD10 in the first recording layer of the DVD-ROM. Similarly, the information data for the second recording layer shown in FIG. 3C is sequentially recorded from the position of the address AD20 in the second recording layer of the DVD-ROM.

When the DVD-ROM having the above recording format is loaded to a DVD player and the reproducing operation is started, the pickup of the DVD player first starts to read the information from the position of the address AD10. That is, the DVD player reproduces the data block $D_1$ and generates its reproduction signal.

When the reproduction of the data block $D_1$ is finished, the pickup of the DVD player reads the jump instruction $JA_1$. In this instance, as shown in FIG. 4, the jump instruction $JA_1$ is an instruction to jump the pickup to the position of the address AD20. The pickup of the DVD player, therefore, jumps to the position of the address AD20 in the second recording layer of the DVD-ROM in response to the jump instruction and restarts the ordinary reading operation from this position. That is, in this instance, the DVD player reproduces the data block $D_2$ and generates its reproduction signal.

When the reproduction of the data block $D_2$ is finished, the pickup of the DVD player reads the jump instruction $JA_2$. In this instance, as shown in FIG. 4, the jump instruction $JA_2$ is an instruction to jump the pickup to the position of the address AD11. The pickup of the DVD player, therefore, jumps to the position of the address AD11 in the first recording layer of the DVD-ROM in response to the jump instruction and restarts the ordinary reading operation from this position. That is, in this instance, the DVD player reproduces the data block $D_3$ and generates its reproduction signal.

It is assumed that the second layer recording start address AD20 is an address which is located on the disc outer periphery rather than the first layer recording start address AD10 and on the disc inner periphery rather than the address AD11.

When the reproduction of the data block $D_3$ is finished, the pickup of the DVD player reads the jump instruction $JA_3$. In this instance, as shown in FIG. 4, the jump instruction $JA_3$ is an instruction to jump the pickup to the position of the address AD21. The pickup of the DVD player, therefore, jumps to the position of the address AD21 in the second recording layer of the DVD-ROM in response to the jump instruction and restarts the ordinary reading operation from this position. That is, in this instance, the DVD player reproduces the data block $D_4$ and generates its reproduction signal.

When the reproduction of the data block $D_4$ is finished, the pickup of the DVD player reads the jump instruction $JA_4$. In this instance, as shown in FIG. 4, the jump instruction $JA_4$ is an instruction to jump the pickup to the position of the address AD12. The pickup of the DVD player, therefore, jumps to the position of the address AD12 in the first recording layer of the DVD-ROM in response to the jump instruction and restarts the ordinary reading operation from this position. That is, in this instance, the DVD player reproduces the data block $D_5$ and generates its reproduction signal.

When the reproduction of the data block $D_5$ is finished, the pickup of the DVD player reads the jump instruction $JA_5$. In this instance, as shown in FIG. 4, the jump instruction $JA_5$ is an instruction to jump the pickup to the position of the address AD22. The pickup of the DVD player, therefore, jumps to the position of the address AD22 in the second recording layer of the DVD-ROM in response to the jump instruction and restarts the ordinary reading operation from this position. That is, in this instance, the DVD player reproduces the data block $D_6$ and generates its reproduction signal.

Figure 6:
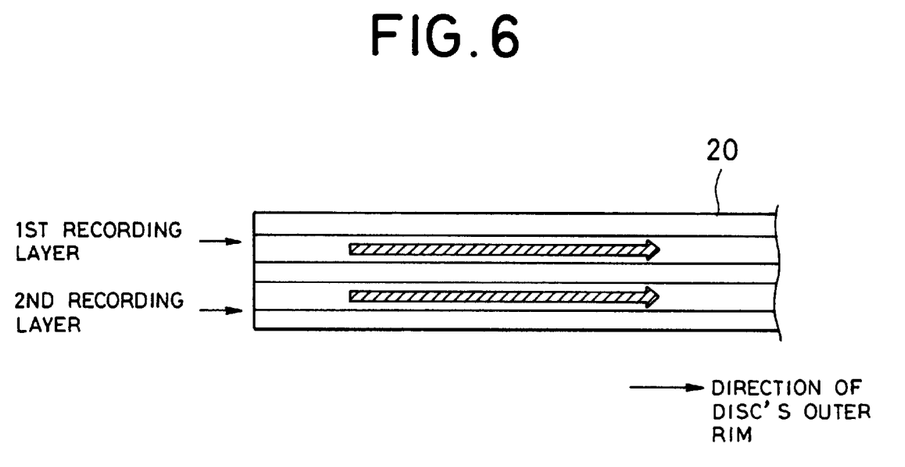
FIGS. 6 and 7 are diagrams showing recording directions of recording layers in a parallel track system and an opposite track system.

The embodiment is adapted to what is called a parallel track system such that the recording track on each of the recording surfaces of two layers of the DVD-ROM is directed from the disc's inner rim to the outer rim as shown by hatched arrows in FIG. 6.

Figure 7:
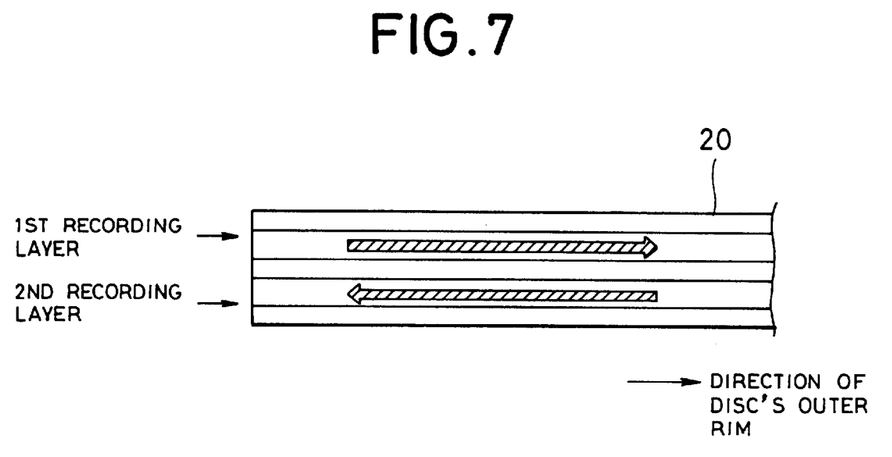

In the invention, however, as shown by hatched arrows in FIG. 7, the invention can be also applied to an opposite track system such that the recording tracks on the recording surfaces of two layers are formed toward the different directions.

Figure 8:
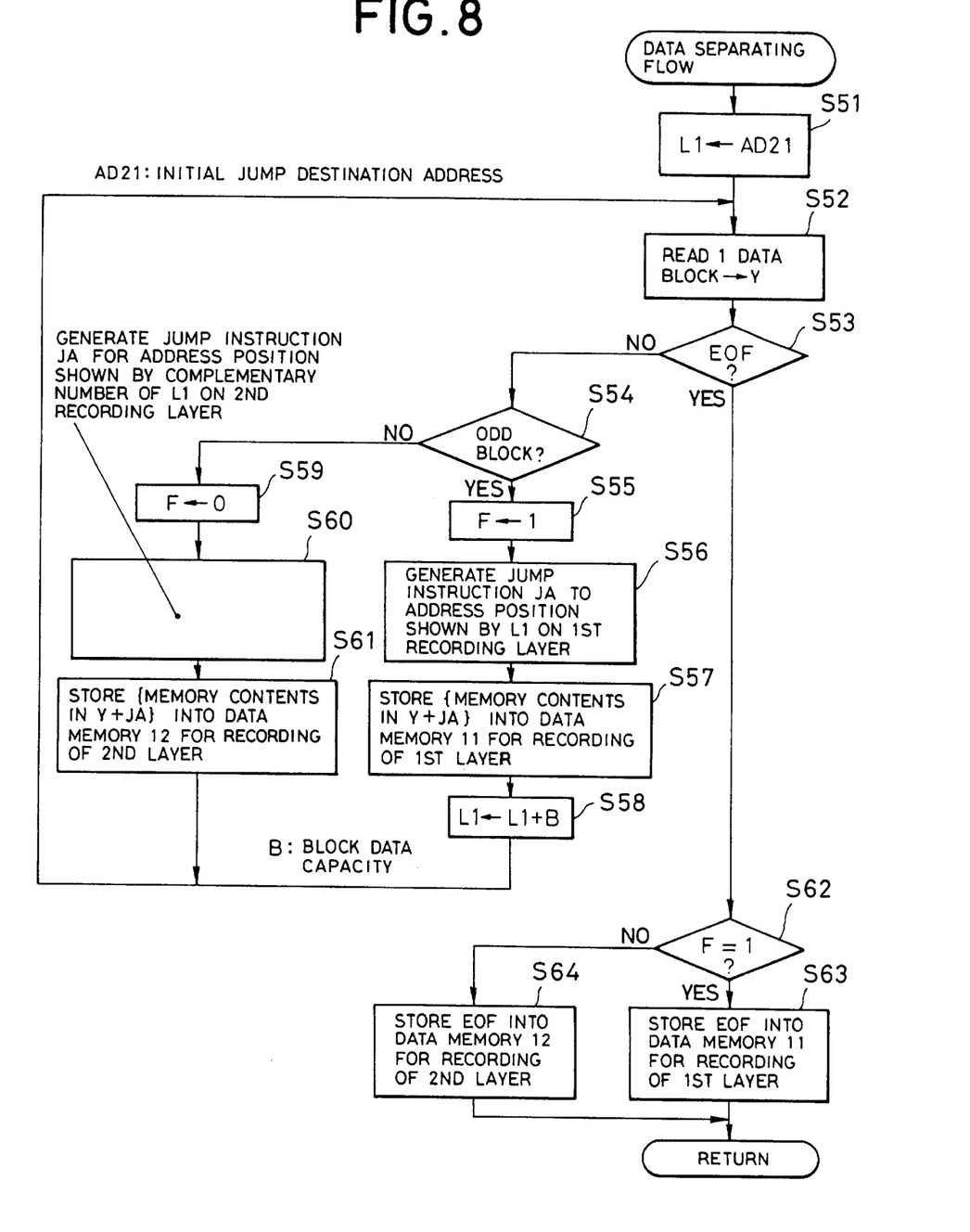
FIG. 8 is a flowchart showing a data separating operation which is performed when information data is recorded onto a recording disc by the opposite track system.

FIG. 8 is a diagram showing an example of a data separating flow made in consideration of the above point.

The data separating flow is executed by a CPU to control the data dividing circuit 10 in a manner similar to that shown in FIG. 2.

In FIG. 8, the CPU first stores the initial jump destination address AD21 into the register L1 built in the CPU (step S51). The CPU reads the information data supplied so as to be recorded onto the recording mother disc every data block as much as a predetermined capacity and stores it into the register Y (step S52). The CPU subsequently discriminates whether the EOF indicative of the end position of the information data exists in the fetched data block or not (step S53). When it is determined in step S53 that no EOF exists, the CPU discriminates whether the data block fetched into the register Y is the odd number designated block or not (step S54).

In step S54, when it is decided that the data block is the odd number designated block, the CPU stores a flag "1", indicative of the odd block into the flag register F (step S55). The CPU subsequently forms the jump instruction JA to the address position (address position on the first recording layer) stored in the register L1 (step S56). The CPU reads out the data block fetched into the register Y and stores the data obtained by adding the jump instruction JA to the end of the data block into the data memory 11 for recording the first layer (step S57). The CPU overwrites and stores the new address obtained by adding the block data capacity B of one data block including the jump instruction JA to the address stored in the register L1 into the register L1 (step S58). After the end of step S58, the CPU is returned to the execution of step S52.

When it is determined in step S53 that the data block fetched in the register Y is not the odd block, the CPU stores a flag "0" indicative of the even number designated block into the flag register F (step S59). The CPU reads out the address stored in the register L1 and generates the jump instruction JA to the address position (address position on the second recording layer) represented by a complement value of the address (step S60). For example, when the address stored in the register L1 is "00FF" (HEX), since the complement value of the address is "FF01" (HEX), the jump instruction JA to jump the pickup to the address position shown by the complement value is generated. The CPU reads out the data block fetched in the register Y and stores the data obtained by adding the jump instruction JA to the end of the data block into the data memory 12 for recording the second layer (step S61). After the end of step S61, the CPU is returned to the execution of step S52.

In step S53, when it is determined that the EOF showing the end position of the information data exists in the data block stored in the register Y, the CPU discriminates whether the storage contents of the flag register F indicates the flag "1" or not (step S62). In step S62, when it is decided that the storage contents of the flag register F indicate the flag "1", the CPU stores the EOF showing the end position of the information data into the data memory 11 for recording the first layer (step S63). In step S62, when it is determined that the storage contents of the flag register F do not indicate the flag "1", the CPU stores the EOF showing the end position of the information data into the data memory 12 for recording the second layer (step S64). When either step S63 or S64 is finished, the CPU exits the data separating flow and is returned to the execution of the main routine (which is not explained).

Figure 9:
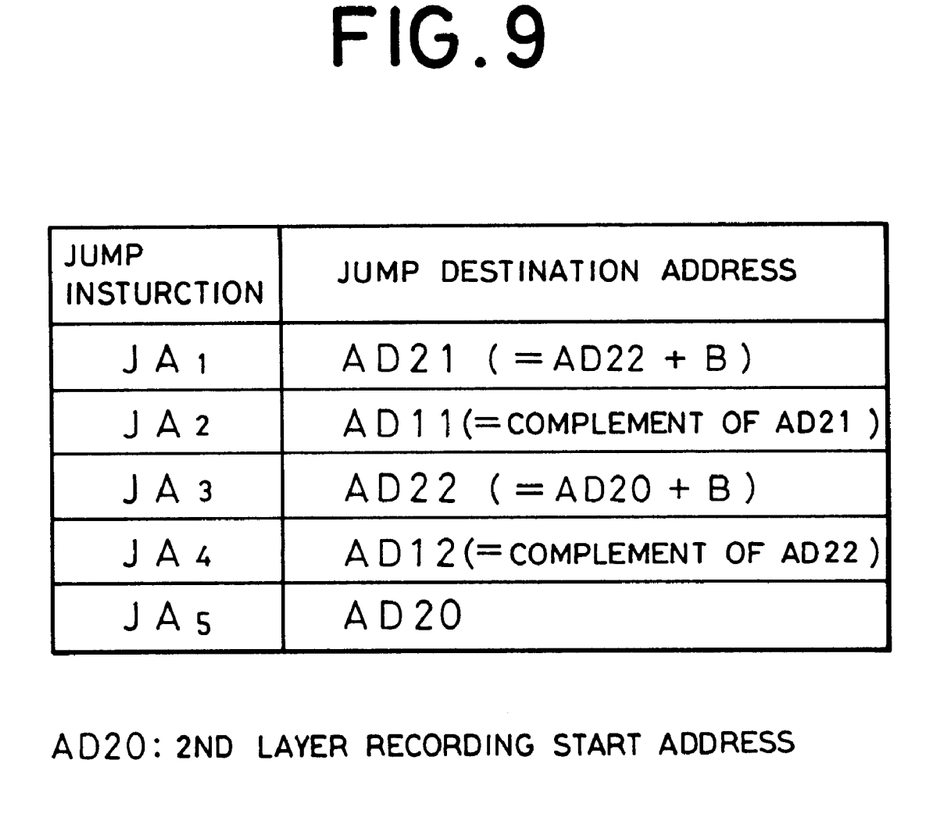
FIG. 9 is a diagram showing jump destination addresses of the jump instructions $JA_1$ to $JA_5$ which are generated when information data is recorded onto the recording disc by the opposite track system.

By the execution of the data separating flow, the information data for the first recording layer and the information data for the second recording layer are stored in the formats shown in FIGS. 3B and 3C into the data memory 11 for recording the first layer and the data memory 12 for recording the second layer, respectively. In case of recording the information data, however, by the opposite track system as mentioned above, the jump destination address by each of the jump instructions $JA_1$ to $JA_5$ is as shown in FIG. 9.

The operation when the information data for the first recording layer and the information data for the second recording layer are recorded onto the first and second recording mother discs by the opposite track system will now be described. When executing the recording, first, the data dividing circuit 10 sequentially reads out the information data for the first recording layer as shown in FIG. 3B from the head block from the data memory 11 for recording the first layer and supplies it to the recording data encoder 13. In accordance with the operation as shown in FIG. 10, the recording head 14 sequentially records the recording signal corresponding to each of the information data $D_1$, $JA_1$, $D_3$, $JA_3$, and $JA_5$ for the first recording layer from the position of the predetermined address AD10 in the first recording layer of the DVD-ROM in the direction of disc's outer rim.

When the recording to the first recording layer is finished, the recording mother disc 20 is exchanged to the second recording mother disc 21. After that, the data dividing circuit 10 sequentially reads out the information data for the second recording layer as shown in FIG. 3B from the last block from the data memory 12 for recording the second layer and supplies it to the recording data encoder 13. In accordance with this operation, as shown in FIG. 10, the recording head 14 sequentially records the recording signal corresponding to each of the information data $D_6$, EOF, $D_4$, $JA_4$, $D_2$, and $JA_2$ for the second recording layer from the position of the address AD20 in the second recording layer of the DVD-ROM in the direction of disc's inner rim.

Figure 10:
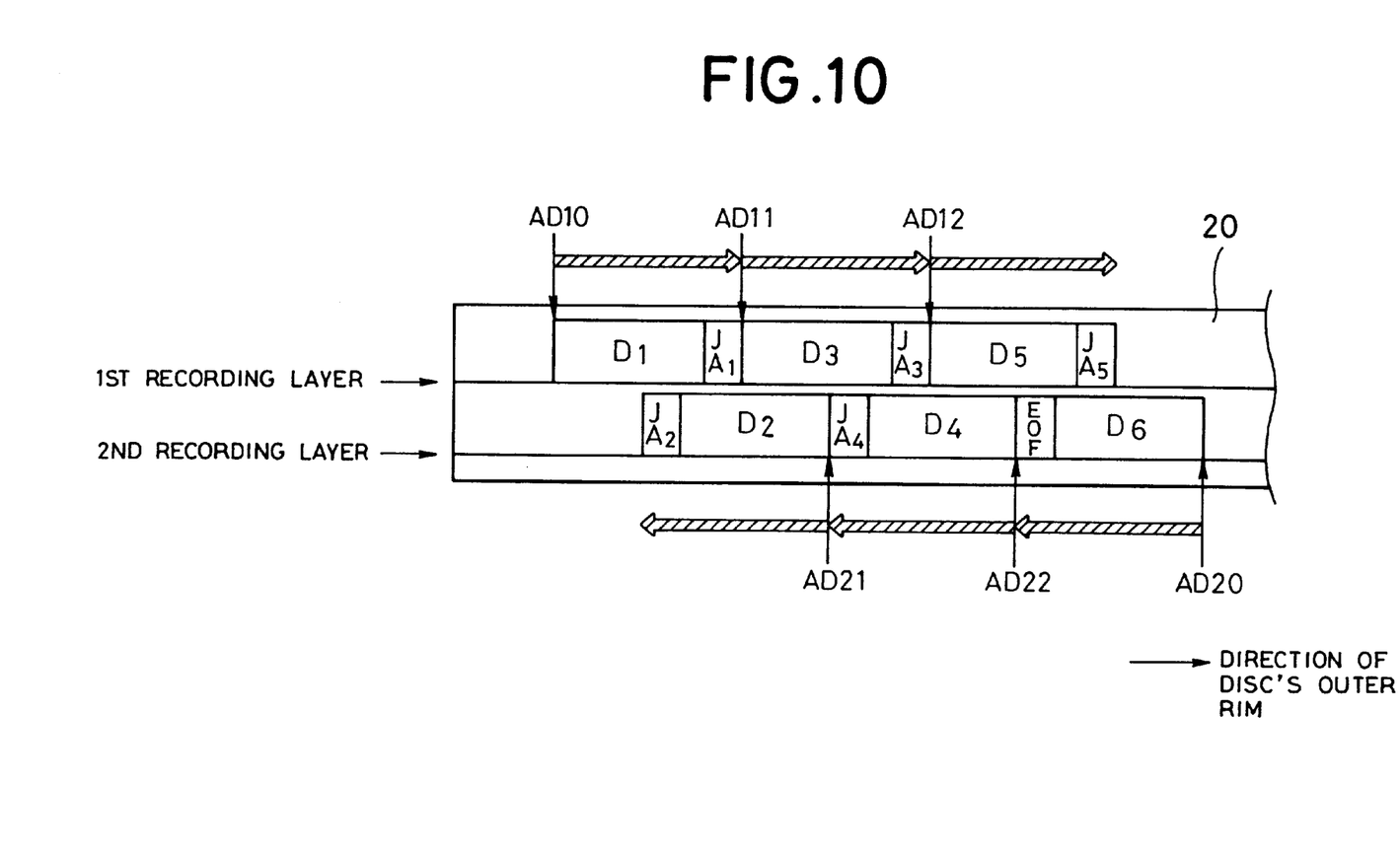
FIG. 10 is a diagram showing an example of a recording format of a DVD-ROM to which information data has been recorded by the opposite track system.

When the DVD-ROM having the recording format as shown in FIG. 10 is loaded into the DVD player and the reproducing operation is started, the pickup of the DVD player first starts to read the information from the position of the address AD10 in the first recording layer. That is, the DVD player reproduces the data block $D_1$ and generates its reproduction signal. When the reproduction of the data block $D_1$ is finished, the pickup of the DVD player reads the jump instruction $JA_1$. In this instance, as shown in FIG. 9, the jump instruction $JA_1$ is an instruction to jump the pickup to the position of the address AD21. In response to the jump instruction, therefore, the pickup of the DVD player jumps to the position of the address AD21 in the second recording layer of the DVD-ROM and starts the reading operation toward the disc's inner rim direction from that point. That is, in this case, the DVD player reproduces the data block $D_2$ and generates its reproduction signal. When the reproduction of the data block $D_2$ is finished, the pickup of the DVD player reads the jump instruction $JA_2$. In this instance, as shown in FIG. 9, the jump instruction $JA_2$ is an instruction to jump the pickup to the position of the address AD11. In response to the jump instruction, therefore, the pickup of the DVD player jumps to the position of the address AD11 in the first recording layer of the DVD-ROM and starts the reading operation toward the disc outer rim direction from here. In this instance, that is, the DVD player reproduces the data block $D_3$ and generates its reproduction signal.

After that, while the pickup of the DVD player similarly jumps between the first recording layer and the second recording layer in response to the jump instruction JA read out from the DVD-ROM, the pickup sequentially reads and reproduces the information data $D_4$ to $D_6$ by repeating the reversal (disc inner rim direction/outer rim direction) of the reading direction.

In the recording format shown in FIG. 10, the odd blocks in the information data are recorded into the first recording layer and the even blocks are recorded into the second recording layer. The invention, however, is not limited to the above recording format.

Figure 11:
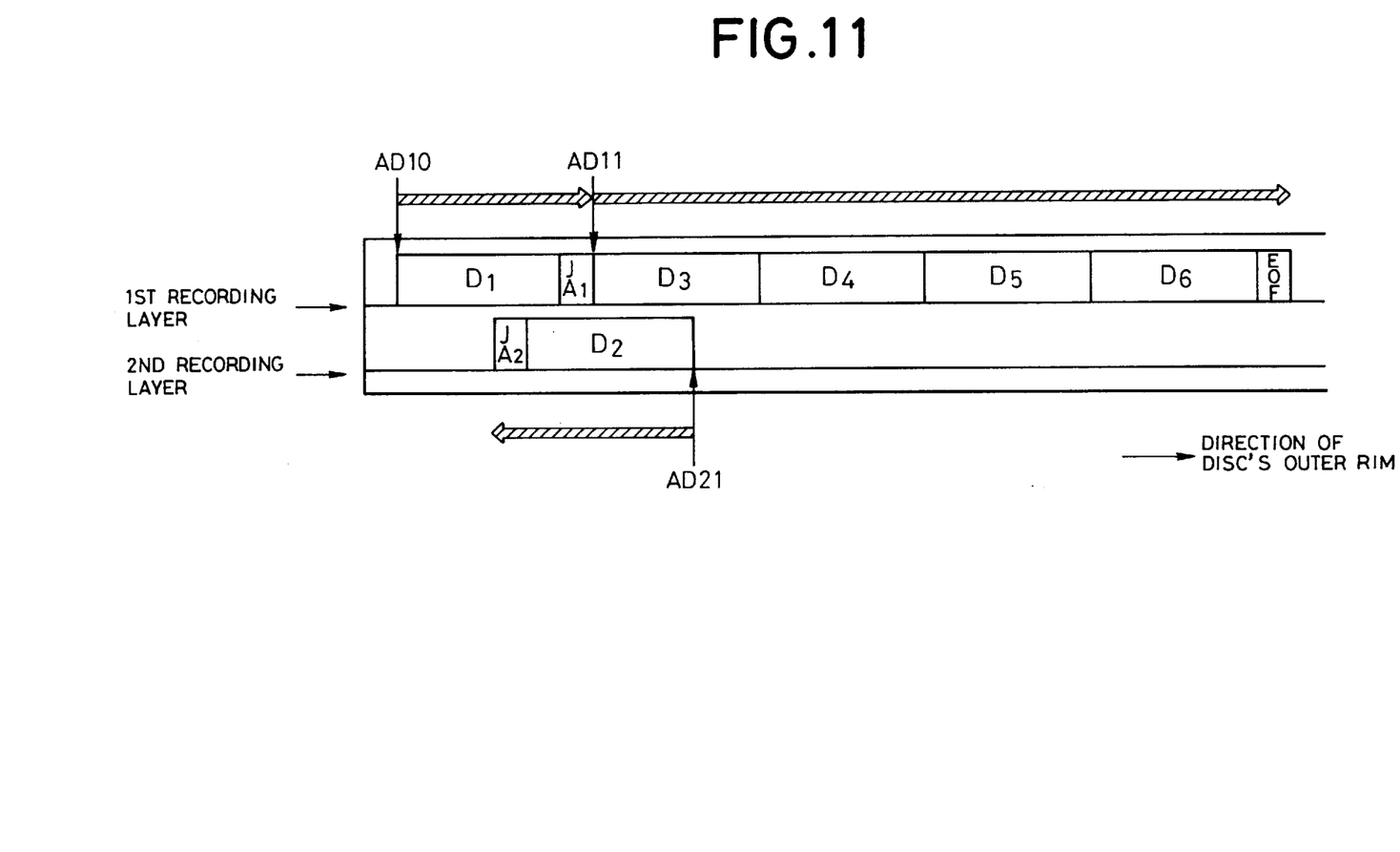
FIG. 11 is a diagram showing another example of a recording format of a DVD-ROM to which information data has been recorded by the opposite track system.
Figure 12:
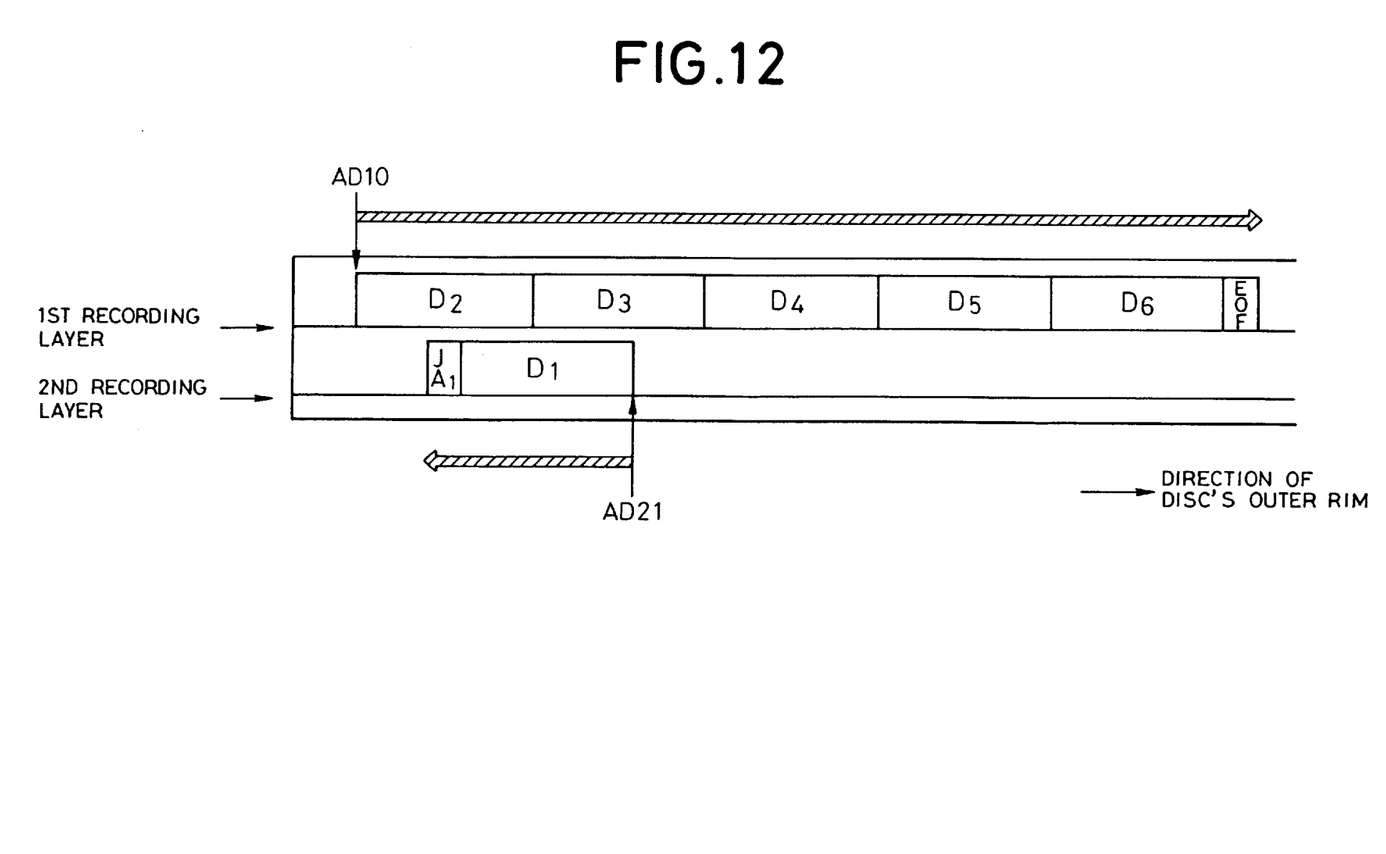
FIG. 12 is a diagram showing another example of a recording format of the DVD-ROM to which information data has been recorded by the opposite track system.

For instance, as shown in FIG. 11, it is also possible to record only the data block $D_2$ and jump instruction $JA_2$ into the second recording layer and to sequentially record the other data blocks into the first recording layer. In this instance, although the jump instruction $JA_1$ showing the jump destination to the head position of the data block $D_2$ is added to the end of the data block $D_1$, there is no need to add the jump instruction to the end of each of the other data blocks $D_3$ to $D_5$. That is, in FIG. 11, the jumping operation between the first and second recording layers is executed in only the head portions (data blocks $D_1$, $D_2$) of the information data blocks. As shown in FIG. 12, if only the head data block $D_1$ in the information data is recorded into the second recording layer and the other data blocks are continuously recorded into the first recording layer, it is sufficient to use only one jump instruction (jump instruction $JA_1$). According to the recording format shown in FIG. 11, the reading start position of the information data is set to the address AD21 of the second recording layer and the jump destination address by the jump instruction $JA_1$ is set to the address AD10 of the first recording layer.

In the embodiment, although the method of recording to the recording disc having only two recording layers has been described, the invention can be also applied to a multilayer disc having three or more recording layers.

In the recording method according to the invention as mentioned above, when a series of information data such as movie software is recorded to the multilayer disc having a plurality of recording surfaces, the information data is divided into a plurality of data blocks of every predetermined data capacity and those data blocks are distributed and recorded into the respective recording layers. Further, a jump instruction showing the next reading destination is additionally recorded to at least one of the data blocks. The jump instruction indicates the jump destination to the other recording layer.

When the recording information is, therefore, read out from the DVD-ROM on which the information has been recorded on the basis of the recording method, the jump instruction as mentioned above appears in the read signal (RF signal) which is generated from the pickup.

If the read signal is, therefore, directly used and an illegal copy is tried to a DVD-R having the recording surface of only one layer or a DVD-RAM, the jump instruction is intermittently mixed into the information data. In this instance, since the other recording layers do not exist in the single-layer disc such as a DVD-RAM (DVD-R), if the jump instruction as mentioned above is reproduced at the time of the information reproduction, the normal reproduction is not performed.

That is, according to the invention, the illegal copy from the multilayer disc (DVD-ROM) to the single-layer disc (DVD-RAM, DVD-R) directly using the read signal (RF signal) which is generated from the pickup can be prevented.

In the embodiment, although the next data block is recorded just after each jump instruction, it is also possible to insert a noise image signal which generates an inharmonious feeling into a boundary between a jump instruction and a data block and to record a resultant signal. In this case, on the reproducing apparatus side, after completion of the execution of the jumping operation, the read signal generated from the pickup is masked for only a predetermined period (period of time during which the noise image signal exists) and, thereafter, a reproducing process is executed. If an illegal copy, therefore, is tried to the DVD-RAM (or DVD-R) by directly using the read signal generated from the pickup, the noise image signal is also copied and a more effective copy prevention can be performed.

In the embodiment, by setting a boundary of each data block at a position in the halfway of a GOP unit in the MPEG, the more effective copy prevention can be realized.

What is claimed is:

1. A recording method of recording continuous information data onto a recording medium having a plurality of recording layers, comprising:

dividing said continuous information data into a plurality of data blocks; and distributing and recording said data blocks into the different recording layers of said recording medium, wherein at least a first data block of said data blocks recorded in one of said different recording layers includes a jump instruction to designate a next reading destination in another one of said different recording layers.

2. A method according to claim 1, wherein the recording layers of said recording medium comprise a first recording layer and a second recording layer, a group of odd number designated blocks among said data blocks is recorded into said first recording layer, and a group of even number designated blocks among said data blocks is recorded into said second recording layer.

3. A recording apparatus for recording continuous information data onto a recording medium having a first recording layer and a second recording layer, comprising:

a data dividing circuit for dividing said continuous information data into a plurality of data blocks, obtaining a first data block group containing data blocks selected from said data blocks as information data for recording in the first layer, and obtaining a second data block group containing data blocks among said data blocks as information data for recording in the second layer; and a recording device that records said information data for recording in the first layer into said first recording layer and recording said information data for recording in the second layer into said second recording layer, wherein said data dividing circuit adds a jump instruction to a first data block to be recorded in one of said first recording layer and said second recording layer, and wherein said jump instruction designates a next reading destination to at least a second data block of said data blocks recorded in an another one of said first recording layer and said second recording layer.

4. An apparatus according to claim 3, wherein said first data group contains consists odd-numbered data blocks among said data blocks, and said second data group contains even-numbered data blocks among said data blocks.

5. A recording medium having a first recording layer and a second recording layer, wherein a plurality of data blocks indicative of continuous information data are distributed and recorded in said first recording layer and said second recording layer, and a jump instruction to designate a next reading destination, which is in one of said first recording layer and said second recording layer, wherein said jump instruction has been recorded in at least one of said data blocks recorded in another one of said first recording layer and said second recording layer.

6. A method according to claim 1, wherein, when said continuous information data is reproduced from said recording medium, said jump instruction causes a reproduction of said first data block to automatically jump to a reproduction of a second data block in said other one of said different recording layers without interruption.

7. A method according to claim 6, wherein said plurality of data blocks recorded in said different recording layers are continuously reproduced without interruption such that said continuous information data is reproduced without interruption.

8. An apparatus according to claim 3, wherein, when said continuous information data is reproduced from said recording medium, said jump instruction causes a reproduction of said first data block to automatically jump to a reproduction of said second data block without interruption.

9. An apparatus according to claim 8, wherein said first data block group and said second data block group are continuously reproduced without interruption such that said continuous information data is reproduced without interruption.

* * * * *